July 17, 1962  P. C. SANDRETTO  3,045,234
NAVIGATION SYSTEM
Filed July 2, 1959  3 Sheets-Sheet 1
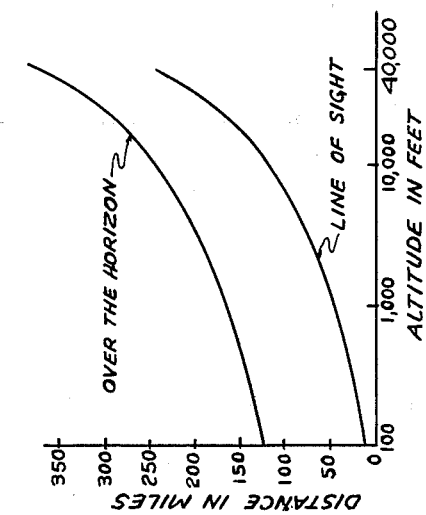
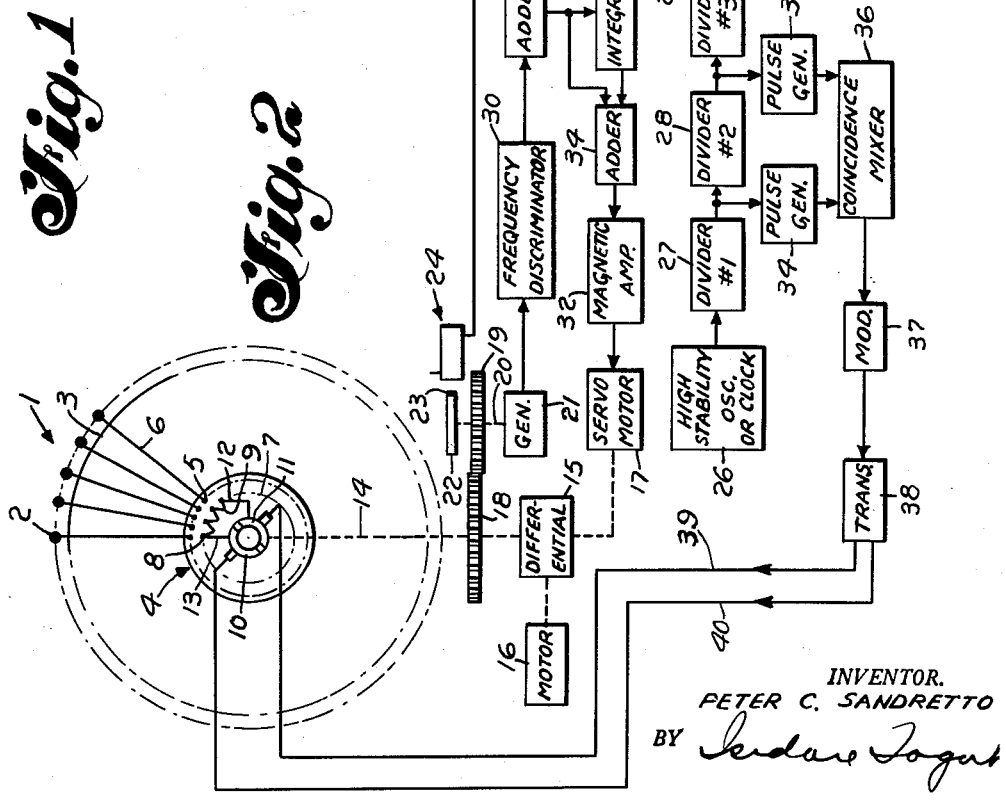
INVENTOR.
PETER C. SANDRETTO
BY
ATTORNEY July 17, 1962 P. C. SANDRETTO 3,045,234
NAVIGATION SYSTEM
Filed July 2, 1959 3 Sheets-Sheet 2

INVENTOR.
PETER C. SANDRETTO
BY
ATTORNEY

United States Patent Office 3,045,234
Patented July 17, 1962

3,045,234
NAVIGATION SYSTEM
Peter C. Sandretto, East Orange, N.J., assignor to International Telephone and Telegraph Corporation, Nutley, N.J., a corporation of Maryland
Filed July 2, 1959, Ser. No. 824,553
7 Claims. (Cl. 343—106)

This invention relates to navigation systems and more particularly to a navigation system utilizing VHF/UHF for determining the bearing and range of an aircraft relative to a transmitting station.

The advantages of very high and ultra high frequencies for navigation have long been recognized. At these frequencies, it is possible to generate narrow field patterns that are particularly useful in eliminating site effects. These frequencies are completely free from static; thus, their use makes possible very accurate position finding systems. The disadvantage of VHF and UHF for radio navigation equipment use, however, lies in the fact that these frequencies have heretofore been able to provide service only to line-of-sight. This propagation limitation requires that an aircraft reselect navigation stations quite often. Further, it has limited the usefulness of VHF/UHF equipment for use with vessels on the surface of the ocean. With helicopter operations, the limited range makes the use of these frequencies unattractive. In recent years, it has been shown that VHF/UHF frequencies can, in fact, propagate beyond the line-of-sight by use of over-the-horizon techniques. In order to obtain useful communications beyond line-of-sight, use is made of very highly directional antennas. The use of these antennas limits such service to only one extremely narrow line. Obviously, navigation service must be provided over a universal area; therefore, it has appeared impractical to use the same techniques in navigation service that are used in communication service.

The reason that VHF/UHF frequencies have not been considered practical for beyond the sight radio navigation systems is that it has been necessary to radiate some signals omni-directionally. In bearing systems, for example, it is necessary to send out a signal in all directions to denote the time when the radiated field pattern has a certain orientation with respect to the earth's geography. Likewise, it has been necessary to transmit from the aircraft to the ground, if it were desired to obtain a reply, in order to measure the total time which elapses between transmission and reception and thereby make a measurement of distance. Clearly, such procedures are impractical in beyond line-of-sight systems. It would be impractical to develop the amounts of power required for beyond the line-of-sight distances for omni-directional transmission. In polar coordinate systems of navigation, that is, systems that give position in terms of bearing and distance, bearing is determined by measuring the time that elapses from the time that the field pattern has a certain orientation to the time that a certain characteristic of the field pattern is received. Similarly, distance is determined by measuring the time between when a pulse leaves an aircraft, travels to a ground transponder and is received back in the aircraft. It is thus seen that the knowledge at the aircraft of "time when" certain phenomena take place at the ground transmitting station is all that is necessary in order to be able to determine these parameters. This knowledge can be obtained by the use of a very accurate frequency standard on the ground and a similar frequency standard carried in the aircraft. These frequency standards are synchronized before the take off and can be high precision quartz crystals or preferably atomic clocks.

An object of this invention, therefore, is the use of VHF/UHF frequency in navigation systems to provide services beyond the line-of-sight.

Another object is to provide a navigation system using VHF frequencies and very accurate synchronized timing means located at the ground station and carried in the aircraft whose position is to be determined.

A feature of this invention is a navigation system for determining the bearing and distance of an aircraft relative to a transmitting station comprising at the station an antenna to transmit pulsed electromagnetic signals in a narrow beam pattern and means to rotate the pattern at a predetermined rate and a timer to control the rotation of the pattern and the transmission of the pulsed signals. A receiver carried by the aircraft is adapted to receive the transmitted signals and also has corresponding timing means that is in time synchronism with a timing means in the transmitter. The timing means at the transmitter and the receiver may be very accurate crystal oscillators or atomic clocks. The receiver comprises means responsive to the timing means to measure the time difference between the known time of occurrence of a predetermined position of the transmitter radiating means and the time when the transmitted signal is received by the aircraft, this time difference being indicative of the bearing of the aircraft relative the transmitting station. The receiver also comprises means to measure the time difference between the known transmission of a pulse at the ground station and the reception of the pulse by the aircraft, the time difference indicating the range of the aircraft relative the transmitting station.

The above-mentioned and other features and objects of this invention will become more apparent by reference to the following description taken in conjunction with the accompanying drawings, in which:

FIG. 1 is a graph showing the relative ranges achieved in line-of-sight propagation and over-the-horizon propagation;

FIG. 2 is a block diagram showing the components of the ground station in one embodiment of this invention;

FIG. 5 is a graph of the waveforms used to illustrate the principles of this invention.

Figure 3:
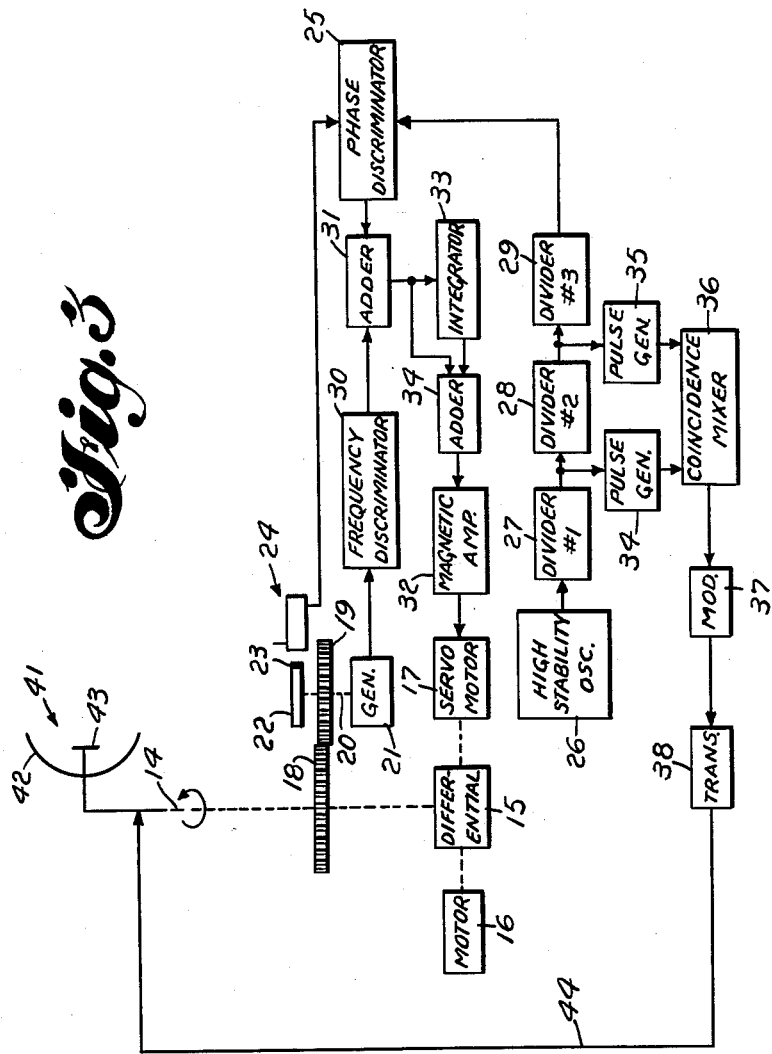
FIG. 3 is a second embodiment of the ground transmitting station.

Referring to FIGURE 1, the graph illustrates the range of a VHF/UHF navigation system such as utilized in this invention. It shows that at 1,000 feet of altitude, normal line-of-sight extends to less than fifty miles, however, with the use of over-the-horizon propagation, service would be provided to distances of nearly 175 miles. At altitudes of 40,000 feet, the line-of-sight extends to nearly 250 miles but with over-the-horizon propagation, service would be provided to distances of over 380 miles.

With reference to FIG. 2, there is shown a ground antenna 1, such as the Wullenweber type antenna array, which is well known in the art and will be briefly described herein. This antenna array comprises a plurality of vertically polarized antennas 2 arranged in a circular pattern. Disposed directly in back of the antennas 2 and also arranged in a circular pattern concentric with the antenna array is a screen 3 which serves as a reflector for the antennas. At the center of the array is disposed a goniometer 4 which contains a plurality of stator plates 5, one for each antenna 2, and to which the antennas are connected by means of RF cables 6. A commutating rotor 7 carries a number of rotor plates 8, the total number of rotor plates being less than the total number of stator plates so that only a portion of the stator plates 5 is capacitively coupled to the rotor plates 8 and therefore only a portion of the total number of antennas 2 is energized at any specific instant of time. Properly phased delay lines 9 connect the rotor plates together and the rotor plates are connected to slip rings 10 and 11 by means of leads 12 and 13. The goniometer rotor 4 and the slip rings 10 and 11 are mounted on a shaft 14 which is coupled to the output of a differential gear box 15. A motor 16 and a servo motor 17 are coupled to the inputs of the differential 15. A gear 18 fastened to the shaft 14 meshes with a gear 19 which is coupled to a shaft 20 that drives a generator 21 and a disk 22. The disk 22 is non-magnetic except for a small slot on the periphery thereof in which there is embedded a small bit of magnetic material 23. The rotation of this disk produces a pulse in a solenoid 24, disposed adjacent to the disk 22 at every revolution of the disk 22. The output of the generator 21 is a voltage at a frequency proportional to the rate of rotation of the shaft 14. The outputs of the generator 21 and the solenoid 24 therefore constitute information of the frequency at which the goniometer is rotating and of the phase of the rotation. The pulse from the solenoid 24 is fed to a phase discriminator 25. The other voltage required for the operation of the phase discriminator 25 is derived from a high stability oscillator 26 through three dividers, 27, 28, and 29. The output of the divider 29 is at the frequency of one cycle per second. When the phase of the output of the solenoid 24 and the phase of the output of divider 29 are identical, there is no output from the phase discriminator 25. The output from the generator 21 is fed to a frequency discriminator 30. This frequency discriminator consists of stable circuits tuned to the correct frequency at which it is desired to rotate the goniometer and, in this case, should be identical with the output of the divider 29. When the output of the generator 21 is at exactly the correct frequency, there will be no output from frequency discriminator 30. The output of frequency discriminator 30 and phase discriminator 25 are added together in an adder 31, which is merely a passive network. The output is then satisfactory for operating a magnetic amplifier 32. This magnetic amplifier 32 controls the servo motor 17 which adds and subtracts revolutions to the goniometer 4 through the gear box 15, thereby causing it to be in phase with the output of divider 29. An integrator 33 and an adder 34 are used merely to derive an additional voltage from the output of the adder 31 in order to dampen the servo loop.

The divider 27 coupled to the output of the oscillator 26 has an output, in this case, of 4044 cycles per second. The period between these cycles corresponds to the time required for a radio wave to travel about 40 nautical miles. This voltage is fed to the divider 28 and also to a pulse generator 34 which has an output of 4044 pulses per second. The output of the divider 28 is 360 cycles per second which is fed to the divider 29 and also to a pulse generator 35, the output of which is 360 pulses per second. The outputs of the pulse generators 34 and 35 are fed to a coincidence mixer 36 which produces an output that is the accurately positioned pulse generated by the 4044 cycle signal but selected by the 360 cycle signal so that there are only 360 pulses per second which are fed to a modulator 37. The output of the modulator 37 feeds a transmitter 38, the output of which is 360 pulses per second that is fed via RF transmission lines 39 and 40 to the slip rings 10 and 11 of the goniometer 4 and thereby transmitted from the antenna 1. These pulses should have a short duration. At a thousand megacycles, this duration may be 3½ microseconds. It is thus seen that the ground transmitter station consists of an antenna which is electrically rotated at an accurately determined frequency and in a phase determined by the high stability and accurate oscillator 26 which may be a highly accurate quartz oscillator or preferably an atomic clock. Further, the transmission is in the form of 360 pulses per second. These pulses are accurately transmitted in time because they are generated through the use of the stable oscillator 26. If then there exists a knowledge of the exact phase of oscillator 26, it is possible to know exactly the position of the electromagnetic beam transmitted by the antenna 1 at any time and also the time that a pulse is being transmitted. The field pattern of the transmitted beam should preferably have a width of three degrees and the transmitter should preferably have a peak power of the order of 100 killowatts.

The embodiment of FIGURE 3 is identical to that of FIGURE 2 with the exception of the antenna. The antenna 41 in this embodiment consists of a parabolic reflector 42 fed by a conventional dipole antenna 43. The antenna is fed from the transmitter 38 by means of the RF transmission line 44 and is rotated by means of the shaft 14 in the same manner as described in FIGURE 3. This antenna, for 1000 megacycle application, could have a diameter of 28 feet. Such an antenna will have a gain of 30 db and will produce a field pattern with a width of three degrees.

Figure 4:
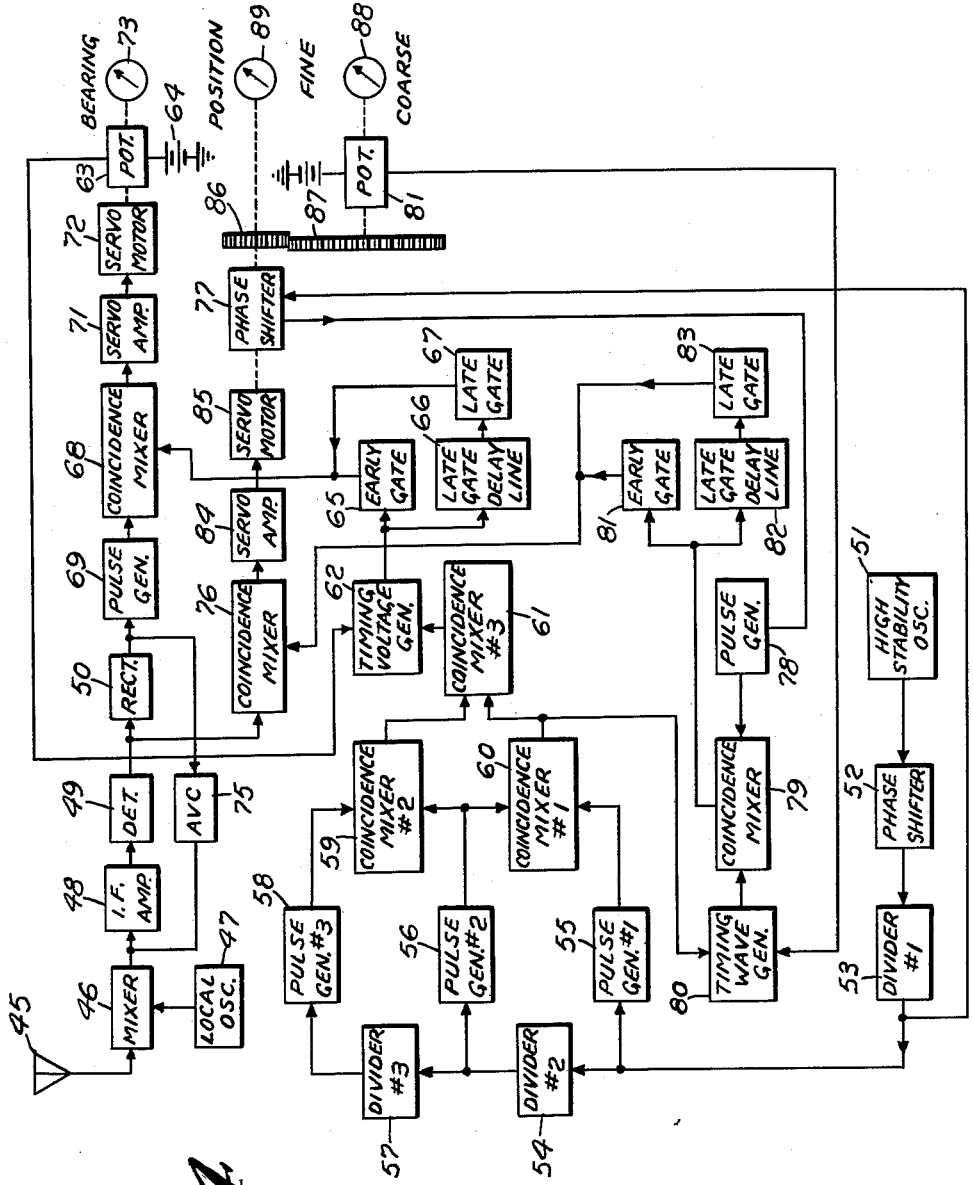
FIG. 4 is a block diagram of the receiver of this invention.

The information transmitted by the ground station is received in the receiving system shown in FIGURE 4. A short non-directional antenna 45 (possibly a halfway dipole) is connected to a mixer 46 to which is also coupled the output of a local oscillator 47. The beat between the two frequencies is amplified in an intermediate frequency amplifier 48 and the output thereof is then detected in a detector 49. Since the transmitting antenna has a narrow beam width of about three degrees and it rotates at the rate of one revolution per second, the envelope of the transmitted wave is as shown in waveform A of FIGURE 5. The output of the detector 49 is a series of pulses, the amplitudes of which vary in time by the rotation of the ground antenna. The envelope of the received pulses is substantially that of a sample of waveform A which is brought out by passing the output of the detector 49 through the rectifier and smoothing circuit 50. This envelope is shown in waveform B. A very high stability oscillator or atomic clock 51 of the same type as that of oscillator 26 used in the ground station is carried by the aircraft. When the aircraft is at a known location, the phase of the output of oscillator 51 is adjusted by a phase shifter 52 so that it is identical to the phase of the output of oscillator 26. The output of the phase shifter 52 is then passed through a divider 53 which has an output of 4044 cycles per second. This output is fed into a divider 54 and a pulse generator 55. The output of the divider 54 is 360 cycles per second and the output of the pulse generator 55 is 4044 pulses per second. The output of the divider 54 is used to generate 360 pulses per second by means of a pulse generator 56. The output of the divider 54 is passed to a divider 57, the output of which is one cycle per second and is used to generate one pulse per second by means of a pulse generator 58. Since it is not possible to generate a pulse with a time accuracy of more than 5 percent, the output of the pulse generator 58 is connected to a coincidence mixer 59 to which there is also connected the output of the pulse generator 56. The output of the coincidence mixer 59 is therefore one pulse per second having a positional accuracy as determined by the accuracy of the 360 pulse-per-second output of the pulse generator 56. Pulse generator 55 has its output connected to a coincidence mixer 60 to which there is also connected the output of the pulse generator 56. The output of the coincidence mixer 60 is 360 pulses per second but positioned in time with an accuracy corresponding to that of the accuracy of the 4044 pulse-per-second output of the generator 55. The outputs of coincidence mixers 59 and 60 are fed to a coincidence mixer 61, the output of which is therefore one pulse per second having a time position accuracy equivalent to the time accuracy of the very high stability oscillator 51.

It is the output of pulses coming from coincidence mixer 61 that are used to initiate a timing voltage in a timing voltage generator 62. Upon receipt of a pulse from the coincidence mixer 61, the timing generator 62 begins to produce a voltage which increases linearly with time. The voltage stops increasing and collapses to zero when it has reached the value determined by the voltage from a potentiometer 63, which derives its voltage from a battery 64. At the time of collapse, a pulse is generated in the timing voltage generator 62 which is fed to an early gate 65 and a late gate delay line 66 which delays a pulse output of the generator 62 to the input of a late gate generator 67 so that the gate pulse generated by the late gate generator 67 occurs immediately after the pulse generated by the early gate generator 65. The outputs of the early gate 65 and the late gate 67 are fed to a coincidence mixer 68. The output of the rectifier 50 initiates a pulse generator 69 when the rectified envelope of the signal in waveform B reaches zero at 70. The output of the pulse generator 69 is fed to the coincidence mixer 68 where it is mixed with the output of the early gate 65 and the late gate 67. If the pulse output of the pulse generator 69 is exactly astraddle the early and late gate pulses, there will be no output of the time coincidence mixer. However, if there is an output of the coincidence mixer 68, this output will be amplified in a servo amplifier 71 which will energize a servo motor 72 to operate until the timing voltage generator 62 is fed to a voltage corresponding to a time in which the output of the pulse generator 69 is exactly astraddle the early and late gate pulses. This time corresponds to the time between when a transmitted beam of the ground antenna was pointing to north and the time when the signal from it was received. This time is indicated on the meter 73 as the bearing of the aircraft from the ground station. To maintain an amplitude of the rectified envelope 74 of waveform B constant, an AVC circuit 75 is incorporated between the output of the rectifier 50 and the input to the IF amplifier 48. The AVC circuit serves to keep the gain constant and thereby minimize any bearing error that might otherwise result.

The output from the detector 49 is also fed to a coincidence mixer 76. The output from the detector, however, is a series of pulses 3½ microseconds wide contained within the envelope 74 and occurring at the rate of 360 per second. The output from the divider 53 is fed to a phase shifter 77; thus, one rotation of the phase shifter 77 corresponds to a distance of 40 nautical miles. The output of the phase shifter 77 is then fed to pulse generator 78 and the output of pulse generator 78 is fed to a coincidence mixer 79 where it is used to accurately time the waveform of timing generator 80. Timing generator 80 obtains its input from the output of the coincidence mixed 60 which is 360 cycles per second. Timing phase generator 80 is similar in operation to the timing voltage generator 62. The amplitude of the voltage at which the timing wave generator 80 collapses is determined by the voltage from potentiometer 81. The output of the coincidence mixer 79 therefore is an accurate pulse generated by the pulse generator 78 and selected by the timing wave generator 80. Thus, the accurate pulse from the generator 78 is mixed with the near accurate pulse from the timing wave generator 80 in the coincidence mixer 79. The output from the mixer 79 is then fed to an early gate 81 and a late gate delay line 82, the output of which is coupled to a late gate 83. The outputs of the early gate 81 and the late gate 83 are then fed into the coincidence mixer 76 to which is also coupled the output of the detector 49.

The output of the coincidence mixer 76 feeds servo amplifier 84, the output of which energizes a servo motor 85. The servo motor 85 drives the phase shifter 77 and through gears 86 and 87 which have a suitable gear ratio, it also drives the potentiometer 81. The servo motor 85 energized by the error voltage output of amplifier 84 will continue to drive the phase shifter 77 until the pulse from the detector 49 is exactly astraddle the early and late gate pulses produced by the early gate 81 and the late gate 83. The delays which produce this result are read approximately on the indicator 88 and accurately on the indicator 89, the total delay being the sum of the rating on both 88 and 89. It is thus seen that since the pulses which come from the high stability oscillator 51 are locked in phase with the pulses generated in the oscillator 26, it is possible by means of this information to measure the time from when a pulse left the transmitter to the time when it is received in the aircraft. This time is converted through suitable calibration in the meters 88 and 89 into a distance indication.

While I have described above the principles of my invention in connection with specific apparatus, it is to be clearly understood that this description is made only by way of example and not as a limitation to the scope of my invention as set forth in the objects thereof and in the accompanying claims.

I claim:

1. A navigation system for determining the bearing and range of a vehicle relative to a transmitting station comprising, at said station, means to generate pulsed electromagnet signals, means to radiate said pulsed electromagnetic signals in a rotating directional beam pattern and a timer to control the generation of said pulsed electromagnet signals, the rotation of said directional beam pattern and the time of transmission of said pulsed signals; and at said vehicle, a signal receiver, timing means in time synchronism with said timer at said station, means responsive to said timing means to measure the time difference between the known time of occurrence of a predetermined position of said beam pattern and the time when the transmitted signal is received by said aircraft which is indicative of the bearing of said vehicle relative said transmitting station, and means to measure the time difference between the known transmission of a pulse at said station and the reception of said pulse by said receiver which is indicative of the range of said vehicle relative said transmitting station.

2. A navigation system for determining the bearing and range of a vehicle relative a transmitting station comprising, at said station, means to generate pulsed electromagnetic signals, a transmitter to transmit said pulsed electromagnetic signals, an antenna to radiate said signals in a narrow beam pattern, means to rotate said antenna at a predetermined rate and a timer to control the generation of said pulsed electromagnetic signals, the rotation of said antenna and the time of transmission of said pulse signals; and at said vehicle, a receiver adapted to receive said transmitted signals, timing means in time synchronism with said timer at said transmitter, means responsive to said timing means to measure the time difference between the time of occurrence of a predetermined position of said antenna and the time when the transmitted signal is received by said vehicle, said time difference being indicative of the bearing of said vehicle relative said transmitting station and means to measure the elapsed time between the known timed transmission of a pulse and the reception of said pulse by said vehicle, said elapsed time indicating the range of said aircraft relative said transmitting station.

3. A navigation system according to claim 2, wherein said timer at said transmitting station comprises a first atomic clock, and said timing means at said receiver comprises a second atomic clock.

4. A navigation system for determining the bearing of a vehicle relative a transmitting station comprising, at said station, means to generate pulsed electromagnetic signals, a transmitter to transmit said pulsed electromagnetic signals, an antenna to radiate said signals in a narrow beam pattern, means to rotate said antenna at a predetermined rate, and a first atomic clock to control the generation of said pulsed electromagnetic signals, the rotation of said antenna and the time of transmission of said pulsed signals; a receiver carried by said vehicle adapted to receive said transmitted signals, a second atomic clock at said receiver in time synchronism with said timer at said transmitter, means controlled by said second atomic clock to measure the time difference between the time of occurrence of a predetermined position of said antenna and the time when the transmitted signal is received by said aircraft, said time difference being indicative of the bearing of said vehicle relative said transmitting station.

5. A navigation system for determining the bearing of a vehicle relative a transmitting station according to claim 4, wherein said vehicle further comprises means to detect said received pulse signals, rectifying means to derive the envelope of said received pulse signals, means responsive to said envelope to generate a first pulse, means controlled by said second atomic clock to generate scanning pulses at a pulse repetition frequency equal to the rate of rotation of said antenna, means to vary the time of generation of said scanning pulses until said first pulse coincides with said scanning pulse, said coincidence denoting time difference between the occurrence of said predetermined position of said antenna and the time when said transmitted signal is received by said aircraft, and means responsive to said time difference to indicate the bearing of said vehicle.

6. A navigation system for determining the range of a vehicle relative a transmitting station comprising, at said station, means to generate pulsed electromagnetic signals, a transmitter to transmit said pulsed electromagnetic signals, an antenna to radiate said signals in a narrow beam pattern, means to rotate said antenna at a predetermined rate, a first atomic clock to control the generation of said pulsed electromagnetic signals, the rotation of said antenna and the time of transmission of said pulsed signals; a receiver carried by said aircraft adapted to receive said transmitted signals, a second atomic clock at said receiver in time synchronism with said timer at said transmitter, and means controlled by said second atomic clock to measure the time difference between the known transmission of a pulse and the time when said pulse is received by said vehicle, said time difference indicating the range of said aircraft relative said transmitting station.

7. A navigation system for determining the distance of a vehicle relative a transmitting station according to claim 6, wherein said vehicle further comprises means to detect said received pulse signals, means controlled by said second atomic clock to generate scanning pulses at the pulse repetition frequency of said transmitted pulses, a coincidence mixer, means coupling said detected pulse signals and said scanning pulses to said coincidence mixer, means responsive to the output of said coincidence mixer to vary the time of generation of said scanning pulses and means responsive to the coincidence of said detected pulses and said scanning pulses to indicate the time difference between said detected pulses and said transmitted pulses, said time difference being indicative of the range of said vehicle from said transmitter.

References Cited in the file of this patent
UNITED STATES PATENTS

| | | |
|---|---|---|
| 1,988,006 | Greig | Jan. 15, 1935 |
| 2,539,905 | Herbst | Jan. 30, 1951 |
| 2,838,753 | O'Brien et al. | June 10, 1958 |